Figures 1, 2:
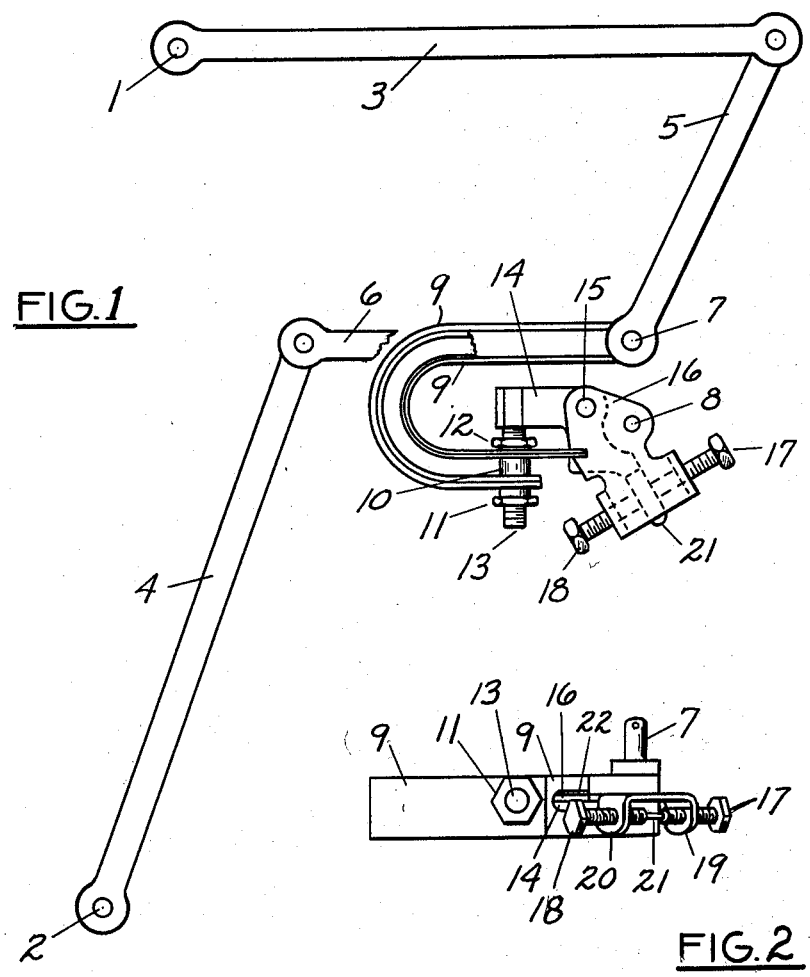

Nov. 17, 1959   R. R. DOUGLAS   2,912,859
TEMPERATURE COMPENSATED TANGENT
Filed April 22, 1957

INVENTOR.
Robert R Douglas
BY
Ralph Hammar
Attorney

United States Patent Office 2,912,859
Patented Nov. 17, 1959

2,912,859

TEMPERATURE COMPENSATED TANGENT

Robert Ritson Douglas, Somerton, Pa., assignor to American Meter Company, Incorporated, Philadelphia, Pa., a corporation of Delaware Application April 22, 1957, Serial No. 654,132

3 Claims. (Cl. 73—281)

This invention is a temperature compensated tangent for gas meters which adjusts the stroke in accordance with the temperature of the gas being measured so the registration corresponds to the heat units of the gas.

Since gas meters are measuring instruments, factors which would affect the accuracy should be avoided. Among these factors are hysteresis due to friction and stresses which prevent the thermostatic element from assuming the position corresponding to its temperature. Rigidity is also important when the thermostatic element forms part of the driving system.

In the present invention, these and other disadvantages are overcome by having the driving connection of the tangent consist of a plurality of nested open ended U's of thermostatic material with the arms of all of the U's extending in the same direction and tengentially about the crankshaft. With such a structure thin bimetallic elements having a larger deflection can be used and yet the rigidity of thick bimetal be obtained because there is no tendency for any of the arms of the U's to resist thermostatic deflection of any of the other arms. The bimetal is thinnest at the innermost U and becomes progressively thicker toward the outermost U thereby obtaining balanced deflection and avoiding strains which would tend to make the ultimate position depend on factors other than gas temperature.

In the accompanying drawing, Fig. 1 is a top plan view of a tangent with the operative connections to the tangent diagrammatically indicated; and Fig. 2 is an edge view of the tangent.

In the drawing, 1 and 2 indicate the gas meter flag rods which are oscillated by the meter diaphragms, 3 and 4 are arms rigidly fixed to the flag rods and 5 and 6 are links connected between the arms 3 and 4 and a wrist pin 7. As the flag rods 1 and 2 are oscillated, the wrist pin 7 is rotated about crankshaft 8 and by suitable connections controls valves which regulate the inflow and outflow from the gas measuring chambers. A tangent connected between the wrist pin 7 and the crankshaft 8 rotates the crankshaft which drives the meter register. The distance between the wrist pin 7 and the crankshaft 8 controls the stroke of the flag rods which are directly actuated by the gas meter diaphragms and thereby controls the volume of gas measured at each stroke. In order to have the meter registration correspond to the heat units of the gas, the stroke should be adjusted in accordance with the gas temperature to be longer in summer when the gas temperature is higher and shorter in winter when the gas temperature is lower in order that all seasons the registration will correspond to gas at a standard temperature and, therefore, have the same heat units per registered cubic foot.

The driving connection between the crankshaft and wrist pin is made entirely by a plurality of open ended U's 9 of bimetal. These bimetal strips constitute the sole driving connection between the wrist pin and crankshaft. It will be noted that the thermostatic U's are nested one within the other and that the thickness of the bimetal increases from the innermost toward the outermost U. By nesting the U's one within the other, the movement of the bimetal in response to changes in temperatures is always in the same direction. For example, if the U's were arranged end to end, the movement would not be the same because under changes in temperatures the arms of the U would tend to have different angles of inclination. When the arms of the U are nested one within the other, changes in temperature do not change the inclination of the arms. The reason for grading the thickness of the bimetal is to obtain the same thermostatic movement of each U. The movement of bimetal under changes in temperature is inversely proportional to the thickness and directly proportional to the square of the length. As a result of the graded thickness the thinner and shorter inner U's have the same movement under changes in temperature as the longer and thicker outer U's. Because all of the U's 9 have the same movement under changes in temperature, there are no stresses built up which would interfere with the thermostatic movement. Another advantage of having the entire driving connection between the wrist pin and crankshaft consist of the bimetallic U's 9 is that hysteresis effects due to friction are eliminated. This means that the stroke of the meter always corresponds to the temperature actually being measured independent of whether the temperature of the gas is rising or falling. If a single U of bimetal were made to have the same rigidity as the nested U's, the length and the thickness of the single U would have to be much greater than the nested U's. The nested U's permit a much smaller size than a single U of the same rigidity and deflection. The maximum length of bimetal within the available space is obtained by having the arms of the U's straddle the crankshaft 8. This also permits a large radius at the base of the U's.

In the meter shown, the crankshaft rotates clockwise and the U's are on the lagging side of the wrist pin as regards the direction of rotation. In the position illustrated, the rotational force exerted on the wrist pin by the links 5, 6 is in a horizontal direction and to the right while the force due to the unbalanced weight of the U's is downward and partially compensates for the bearing loads of the rotational forces. If the U's were on the leading side, the out of balance weight would add to the bearing loads of the rotational forces. It will be noted that the rotational force on the wrist pin is substantially in line with the arms of U's connected to the wrist pin and the deviation will be relatively slight with changes in temperature.

One end of the U's is fixed to the wrist pin 7 and the other end of the U's is fixed to a sleeve 10 confined between nuts 11 and 12 threaded on a stud 13 fixed to a lever 14 pivoted at 15 on a bracket 16 fixed to the crankshaft 8. The stroke of the tangent is adjusted to the meter characteristics by moving the sleeve 10 along the stud 13 by means of the nuts 11 and 12. The stud 13 is substantially parallel to a centerline connecting the crankshaft and wrist pin so the adjustment of the nuts 11 and 12 merely changes the stroke without affecting the angular position of the wrist pin with respect to the crankshaft.

The valve timing is adjusted by set screws 17 and 18 threaded in ears 19 and 20 on the bracket 16 and engaging an arm 21 on the lever 14 to pivot it about the pivot 15. Since the pivot 15 is located on the lagging side of the centerline connecting the crankshaft and wrist pin, the movement of the wrist pin by the set screws 17 and 18 both changes the angular relation of the wrist pin with respect to the crankshaft and also changes the distance between the crankshaft and wrist pin. In conventional tangents, the registration at both the open and check rates is affected by the valve timing. By the present tangent, the valve timing can be adjusted at one of the rates (e.g., the low or check rate) without affecting the meter registration at the other of the rates (e.g., the high or open rate). The reason for this is that the angular adjustment of the wrist pin at the same time makes a compensating length adjustment in the distance between the wrist pin and crankshaft.

In the adjustment of the meter, the open rate proof is adjusted by the nuts 11 and 12 to the proper length corresponding to the temperature of the gas being measured. The check rate is then adjusted by the set screws 17 and 18. The meter is now set to register the flow of gas equivalent to gas at standard temperature. In winter, when the gas is cold, the bimetal U's will bring the wrist pin 7 closer to the crankshaft 8 and in summer the opposite movement of the wrist pin will take place. The innermost U has a slot 22 embracing the lever 14 and bracket 16 which prevents tilting of the U's during adjustment of the nuts 11 and 12.

There is no possibility for hysteresis due to friction because the sole driving connection between the crankshaft and wrist pin is through the bimetal. The nested U's achieve a rigidity comparable to the combined thickness and a deflection comparable to the individual elements, thereby providing both the rigidity needed for accuracy of registration and the deflection needed for thermal compensation.

What is claimed as new is:

1. A temperature compensated gas meter tangent having a plurality of U's of bimetal nested within each other with the corresponding arms of each U extending in the same direction from the base of the U and having ends adjacent each other, the thickness of the bimetal in each U increasing from the innermost toward the outermost U, a wrist pin anchored to the adjacent ends of one of the arms of each of the U's, a bracket for connection to a crankshaft, means anchoring the adjacent ends of the other of the arms of each of the U's to the bracket, said one arms of the U's extending crosswise of a centerline connecting the wrist pin and crankshaft, and said U's constituting the sole driving connection between the crankshaft and wrist pin.

2. A temperature compensated gas meter tangent having a plurality of U's of bimetal nested within each other with the corresponding arms of each U extending in the same direction from the base of the U and having ends adjacent each other, a wrist pin anchored to the adjacent ends of one of the arms of each of the U's, a bracket for connection to a crankshaft, a lever pivoted on the bracket on the lagging side of a centerline connecting the crankshaft and wrist pin as regards the direction of rotation of the crankshaft, a stud on the lever extending substantially parallel to said centerline, a bushing on the stud, means anchoring the adjacent ends of the other of the arms to the bushing, means locking the bushing in adjusted position along the length of the stud, means for locking the lever in adjusted angular relation to the bracket, said one arms of the U's extending crosswise of said centerline, and said U's constituting the sole driving connection between the crankshaft and wrist pin.

3. A temperature compensated gas meter tangent having a plurality of U's of bimetal nested within each other with the corresponding arms of each U extending in the same direction from the base of the U and having ends adjacent each other, a wrist pin anchored to the adjacent ends of one of the arms of each of the U's, a bracket for connection to a crankshaft, means anchoring the adjacent ends of the other of the arms of each of the U's to the bracket, both of said one and said other arms of the U's extending crosswise of a centerline connecting the crankshaft and wrist pin and said other arms of the U's extending in a direction to intersect said centerline on the side of the crankshaft opposite the wrist pin whereby the U's straddle the crankshaft, and said U's constituting the sole driving connection between the crankshaft and wrist pin.

References Cited in the file of this patent

UNITED STATES PATENTS

| | | |
|---|---|---|
| 583,633 | Roesch | June 1, 1897 |
| 2,159,819 | Snediker | May 23, 1939 |
| 2,339,956 | Sillers | Jan. 25, 1944 |